Figure 1:
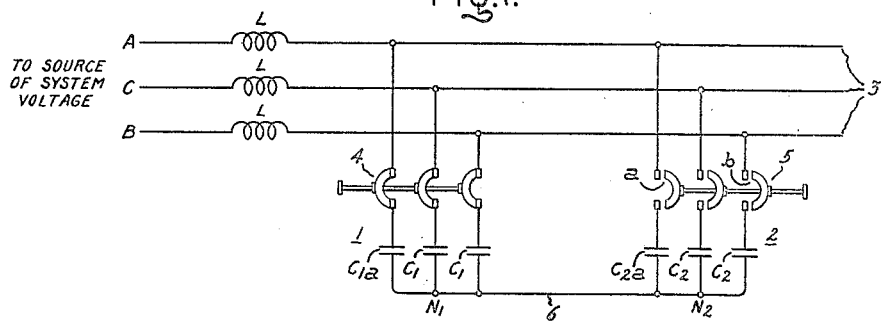

April 25, 1944.   T. W. SCHROEDER   2,347,512
ELECTRIC CIRCUIT
Filed May 20, 1942

Inventor:
Theodore W. Schroeder,
by Harry E. Dunham
His Attorney.

UNITED STATES PATENT OFFICE 2,347,512

ELECTRIC CIRCUIT

Theodore W. Schroeder, Schenectady, N. Y., assignor to General Electric Company, a corporation of New York Application May 20, 1942, Serial No. 443,779

3 Claims. (Cl. 172—238)

This invention relates to electric circuits and more particularly to an improved circuit arrangement for facilitating the switching of capacitors.

The use of capacitors for improving the power factor of alternating-current cricuits and thus increasing the real power supplying capacity of such circuits is becoming more and more important and widespread. Furthermore, the sizes of such capacitors are steadily increasing so that at the present time the use of shunt capacitors in banks up to 25,000 kilovolt amperes is being given serious consideration and several installations having capacitor sizes almost this large have already been made. With this growing use of capacitors, it is becoming increasingly necessary to apply adequate power circuit breakers to the task of switching these large capacitor banks, either totally or in steps, on and off the system.

It has long been recognized that the switching of capacitive circuits can become difficult. Thus, when a capacitor bank is de-energized, larger than normal system voltages may exist across the circuit breaker contacts because of the trapped charge on the capacitor. This may impose a greater than normal task on the circuit breaker dielectric in order to interrupt the current with a minimum of restriking, and if restriking occurs, there may be voltage stresses above normal on the capacitor units as well as on the other connected equipment.

Most large-size alternating-current power circuits are polyphase circuits. With such circuits the shunt capacitor banks are usually star-connected, rather than mesh-connected, so as to reduce the voltage and cost of the individual capacitors, and the neutral of the star-connection is ungrounded so as to prevent the flow of harmonic currents and so as to facilitate the fusing of the individual capacitors for each phase. In de-energizing such ungrounded-neutral star-connected capacitor banks there is a shift in voltage of the neutral of the bank with respect to ground which further increases the switching duty.

It is often undesirable to have all of the shunt capacitance for the circuit in one bank because changes in operating conditions of the circuit usually require variations in the amount of connected capacitive reactance and it is therefore common practice to divide the total capacitive reactance into a plurality of banks, usually of equal size, each of which is provided with its own circuit breaker so that the shunt capacitive reactance for the circuit may be changed in relatively small steps.

I have discovered that when the neutrals of such capacitor banks are tied together solidly by a relatively low impedance conductor, the maximum voltage across the switch contacts when a bank is disconnected is materially reduced with respect to the maximum voltage which occurs when the neutrals are unconnected. This may be explained qualitatively in general terms by considering that the neutral or neutrals of the unswitched capacitor bank or banks remain substantially at ground potential and thus by reason of the interconnection of all of the neutrals it tends to hold the neutral of the switched capacitor bank at ground potential. It thus follows that the greater the ratio of the connected or unswitched capacitance to the disconnected or switched capacitance the more nearly the voltage of the neutral of the switched capacitance is held to ground potential and consequently the lower will be the voltage across the switch contacts.

An object of the invention is to provide a new and improved electric circuit.

A further object of the invention is to provide a new and improved circuit arrangement for the switching of shunt capacitors.

Still another object of the invention is to provide a new and improved circuit arrangement for facilitating the disconnection in steps of polyphase shunt capacitor banks which have ungrounded neutrals.

The invention will be better understood from the following description taken in connection with the accompanying drawing and its scope will be pointed out in the appended claims.

Figure 2:
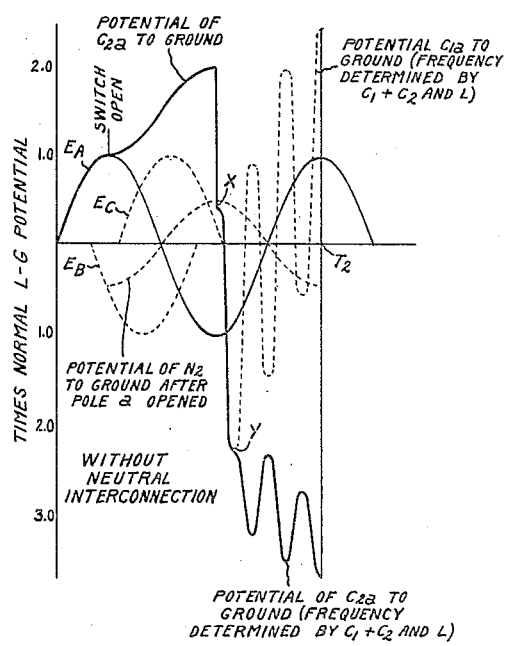
Figure 4:
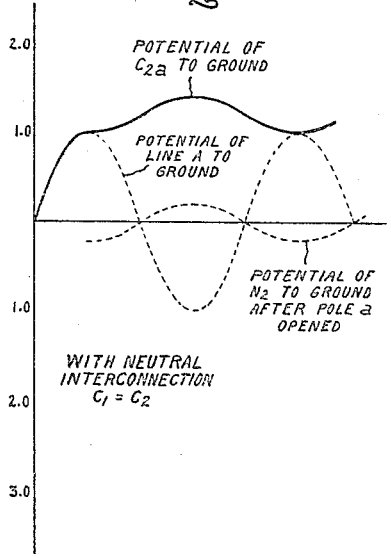
Figure 3:
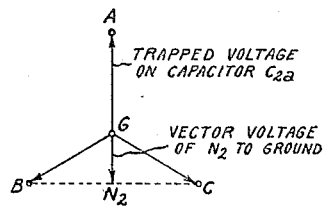

In the drawing Fig. 1 illustrates diagrammatically an embodiment of the invention, Fig. 2 is a set of voltage curves for showing the voltages across the open contacts of a switch which disconnects one of the capacitor banks in Fig. 1 when the neutrals of the two banks are unconnected, Fig. 3 is a vector diagram for explaining a feature of Fig. 2, and Fig. 4 is another set of voltage curves drawn to the same scale as Fig. 2 showing the switch contact voltages with the neutrals of the capacitor banks interconnected.

Referring now to the drawing and more particularly to Fig. 1, there is shown therein two undergrounded-neutral star-connected capacitor banks 1 and 2 which are arranged for selective shunt connection across and disconnection from a three-phase power circuit 3 by means of separate switching means 4 and 5 respectively.

conductors A, B and C which are connected to any suitable source of balanced three-phase voltage (not shown). These three lines have a certain amount of inherent inductance per unit length designated by the three coils L. The switching means 4 and 5 may be of any suitable type and are shown by way of example as being triple-pole circuit breakers.

Although only two capacitor banks have been shown, it should be understood that as many such banks as desired may be utilized. The neutrals of all of the banks are interconnected solidly by an ungrounded low impedance conductor 6.

In describing the operation of the invention it will first be assumed that the neutrals $N_1$ and $N_2$ of the two capacitor banks are unconnected and that switch 5 has been opened so as to disconnect the capacitor bank 2.

Referring now to Fig. 2, the various curves are all plotted in terms of times normal line-to-ground potential as ordinates v. time as abscissae. The curves $E_A$, $E_B$ and $E_C$ are the line-to-ground voltages of the phase conductors A, B and C of circuit 3 and, as shown, they are displaced from each other by 120 electrical degrees. At zero time in Fig. 2 the voltage $E_A$ is zero so that the current through the capacitor $C_{2a}$ is a maximum. Ninety electrical degrees later the voltage $E_A$ has reached a maximum and due to the displacement between the current and voltage in a capacitor the current in capacitor $C_{2a}$ will be zero. Therefore, if switch 5 is opened some time between the instants when the voltage $E_A$ is zero and maximum, any arc which is drawn will go out at the current zero point corresponding to the maximum point of the voltage $E_A$ in accordance with conventional alternating-current circuit breaker theory.

Capacitor $C_{2a}$ is now open circuited so that there is trapped on it a voltage equal to the normal maximum line-to-ground voltage of the power circuit. Also, the neutral voltage $N_2$ shifts with respect to ground by an amount equal to one-half the normal line-to-ground voltage of the system. These two effects may be seen more easily by reference to Fig. 3 wherein the point G represents the ground or neutral of the system line-to-ground voltages A—G, B—G and C—G. As soon as the arc across the pole $a$ of switch 5 goes out there is no longer a connection between line conductor A and capacitor $C_{2a}$ so that the voltage of the neutral $N_2$ shifts from G to the mid-point of the vector line-to-line voltage between lines B and C. This shift of the neutral voltage with respect to ground can be seen from elementary geometrical considerations to be one-half the line-to-ground voltage of the system and furthermore it is opposite in phase to the line-to-ground voltage of the conductor A. In Fig. 3 the line A—G may also be considered as representing the trapped voltage on the capacitor $C_{2a}$. This trapped voltage is not a vector but is fixed in direction.

Returning now to Fig. 2, the curve labeled "Potential of $N_2$ to ground after pole $a$ opened" is the sine wave of the vector voltage G—$N_2$ of Fig. 3. It starts at a time equal to 90 degrees in Fig. 2 and has a maximum value in the negative direction which is equal to one-half the normal line-to-ground voltage of the system. Thus, although the vertical distance between the peak value of $E_A$ and the original value of this neutral-to-ground potential curve represents the voltage-to-neutral $N_2$ of the contact of pole $a$ of switch 5 potential-to-ground of this point is still equal to the peak value of $E_A$. However, as it is the potential difference between $N_2$ and the lowermost contact of pole $a$ which remains fixed, the potential-to-ground of this contact increases as the negative value of the voltage between $N_2$ and ground decreases to zero and then increases in the positive direction up to its maximum value of one-half normal line-to-ground voltage. At this point the potential of the lowermost contact of pole $a$ with respect to ground reaches a value of twice normal line-to-ground voltage and at the same instant $E_A$, which is the voltage applied to the uppermost contact of the pole $a$, reaches its maximum negative value of unity line-to-ground potential. Consequently, the voltage difference across the contacts of the pole $a$ is three times normal line-to-ground voltage.

We will assume that at this point the arc restrikes across the contacts of the pole $a$. There will then be a practically instantaneous equalization of the voltages of the contacts of the switch, which means an equalization of the voltages across the capacitors $C_{1a}$ and $C_{2a}$. This equalization results in a decrease in the voltage of capacitor $C_{2a}$ from its peak value of twice normal line-to-ground voltage to point X, which is approximately one-half normal line-to-ground voltage, and an increase in the voltage of the capacitor $C_{1a}$ from the maximum negative line-to-ground value of $E_A$ at that instant to point X, representing an increase in the voltage of capacitor $C_{1a}$ to 1½ times normal line-to-ground voltage. The voltage of point X to ground is determined by the relative size of the capacitor banks and in terms of times normal peak line-to-ground voltage of the circuit is $$\frac{C_2-C_1}{C_2+C_1}$$

This new voltage-to-ground of the capacitors is 1½ times the maximum value of the system-to-ground voltage above the normal system voltage for conductor A at that instant so that the voltage of the conductor A and the capacitors $C_{1a}$ and $C_{2a}$ continues to drop rapidly. However, because of the inherent inductance in the conductors of the circuit there takes place a transient interchange of energy between the capacitors and the inductance so that the voltage of the capacitors overshoots and instead of stopping when it reaches the curve of the normal voltage $E_A$ it continues on downward by an amount substantially equal to the excess value it had at point X until at point Y the arc again goes out as this is substantially a current zero point. The voltage of capacitor $C_{2a}$ then becomes a natural frequency transient on which is superimposed the wave of the voltage-to-ground of the neutral $N_2$. The frequency of this transient is determined by the inherent inductance of the circuit conductors and the capacitance of the capacitor. Similarly, the voltage of capacitor $C_{1a}$ becomes a high frequency transient which is superimposed on the voltage $E_A$. This is shown by the dotted curve beginning at point Y. The frequency of the transient is determined by the ratio of C to L. The voltage across the switch contacts of the pole $a$ is the difference between the voltages-to-ground of the heavy curve and the dotted curve and as will be seen from the drawing, this may reach relatively very high values. For example, at time $T_2$ this voltage may be six times the normal system-tolikely to restrike at this six times normal value of voltage whereas it restruck originally at a value of three times normal voltage is that the contacts of the switch have been separating and are now further apart so that they are able to withstand a higher voltage.

In Fig. 4 the effect of solidly interconnecting the neutrals $N_1$ and $N_2$ is shown. The curve $E_A$ is the same as in Fig. 2. However, the curve of the potential of $N_2$ to ground after the switch is opened has a substantially lower maximum value. This is because the neutral $N_1$ tends to stay at ground potential because of the symmetrical connection of the capacitors $C_1$ to the conductors A, B and C. It has been found that the maximum value of the voltage of $N_2$ to ground when the neutrals $N_1$ and $N_2$ are solidly tied together is expressed by the equation $$E_{N_2} - G = \frac{C_2 \times E}{3C_1 + 2C_2}$$

in which $E_{N_2-G}$ is equal to the peak voltage of $N_2$ to ground, $C_1$ and $C_2$ are the values of their respective capacitances and E is the peak value of the line-to-ground voltage of the main circuit 3, which in Figs. 2 and 4 has unit value. Fig. 4 has been plotted for the case in which $C_1$ equals $C_2$ so that the peak value of the voltage of $N_2$ to ground is 0.2. As in Fig. 2, if the switch 5 is opened before the voltage $E_A$ reaches its peak value the arc will go out at current zero corresponding to the peak voltage value of $E_A$. This again traps a charge on capacitor $C_{2a}$ equal to full line-to-ground voltage but as the voltage of $N_2$ to ground now only has a peak value of 0.2, instead of 0.5 as in Fig. 2, the maximum potential across the opened contacts of the pole $a$ will be 2.4 times normal line-to-ground voltage.

It will thus be seen from a comparison of Figs. 2 and 4 that the maximum voltage stress across the contacts of the opened pole $a$ of the switch is materially less when the neutrals are solidly interconnected and that furthermore the higher the value of $C_1$ in comparison with $C_2$ the smaller will be this maximum voltage difference, the limiting case occurring when $C_1$ is infinitely large with respect to $C_2$, in which case the neutral $N_2$ would not shift from ground potential so that the maximum voltage stress across the switch under those conditions would be twice normal voltage.

The above relations can be summarized by stating that the maximum voltage the switch contacts can attain before a restrike with the neutrals solidly connected is $$\left[ 2 + 2 \left( \frac{C_2}{3C_1 + 2C_2} \right) \right] E$$

where the values of C and E are the same as in the previous formula.

However, before the capacitor bank 2 is disconnected from the circuit 3 the other poles of the switch 5 must also clear. After pole $a$ has interrupted current through it the circuit conditions and duty on the second pole to clear are somewhat different. If the neutrals are unconnected and it is assumed that pole $b$ is the next one to have a current zero, then there will be impressed on the lowermost contact of this pole a voltage equal to $\sqrt{3}$ times the normal line-to-ground voltage because of the fact that the two capacitors $C_2$ have, since the clearing of the pole $a$, been connected in series across the line-to-line voltage between the conductors C and B through the uncleared pole of the switch. One hundred and eighty electrical degrees later there will be impressed on the uppermost contact of the pole $b$ a voltage equal to the line-to-line voltage between the conductors C and B, the connection being from the conductors C through the two capacitors $C_1$. In other words, at this particular instant the lowermost contact of the pole $b$ will be below the voltage of the conductor C by the line-to-line voltage of the system and the upper contact of the pole $b$ will be above the voltage of the conductor C by the line-to-line voltage of the system so that the peak voltage across the switch contacts will be 3.46 times normal.

However, with the neutrals interconnected the voltage on the pole $b$ will be substantially less for all practical ratios of $C_1$ and $C_2$ and for the case where $C_1 = C_2$ the peak value of this voltage will be approximately 2.5 which is substantially the same as the peak value of the voltage across the pole $a$ with the neutrals connected for the same ratio of $C_1$ to $C_2$.

The opening of the third pole of the switch offers no difficulty as no current will now be flowing provided the neutrals are unconnected. When the neutrals are tied together electrically the voltage of the neutral of the unswitched bank tends to remain at ground potential and what might be called the effectiveness of this tendency is proportional to the ratio of $C_1$ to $C_2$. Therefore, the maximum possible voltage across the contacts of the third pole to clear when the neutrals are connected would be twice normal-to-ground voltage and would occur when the ratio of $C_1$ to $C_2$ is equal to infinity.

The various switch voltages are summarized for convenience in the following table.

*Maximum switch voltages without a restrike*

[Times normal L—G peak value]

|  | First pole to clear | Second pole to clear | Third pole to clear |
|---|---|---|---|
| Neutrals unconnected | 3.0 | 3.46 | 0 |
| Neutrals connected: | | | |
| $\frac{C_1}{C_2} = \infty$ | 2.0 | 2.0 | 2.0 |
| $\frac{C_1}{C_2} = 1$ | 2.4 | [1] 2.5 | 1.75 |
| $\frac{C_1}{C_2} = 0$ | 3.0 | 3.46 | 0 |

[1] Approximate.

Ordinarily, the most unfavorable ratio of $C_1$ to $C_2$ encountered in practice is unity. This is because the capacitor banks are usually of equal size so that if there are N capacitor banks connected to the circuit and one is to be disconnected therefrom the ratio of $C_1$ to $C_2$ will be equal to $$\frac{N-1}{1}$$

which obviously is greater than one for all values of N greater than two. It will thus be seen from the above table that the maximum value of switch voltage with the neutrals connected will in all practical cases be less than the maximum switch voltage with the neutrals unconnected.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a polyphase alternating-current power circuit, a plurality of ungrounded neutral star-connected banks of capacitors, said banks being connected in parallel circuit relation with each other and in shunt circuit relation with said power circuit, a relatively low impedance interconnection between the neutrals of said banks, and switching means for disconnecting one of said banks from said circuit.

2. The combination as in claim 1 in which said switch means is a unitary multiple pole switch.

3. The combination as in claim 1 in which said banks have substantially equal capacitance.

THEODORE W. SCHROEDER.